United States Patent
Kroll et al.

(10) Patent No.: US 9,602,340 B2
(45) Date of Patent: Mar. 21, 2017

(54) PERFORMANCE MONITORING

(75) Inventors: Thomas Kroll, Neulussheim (DE); Ina Scherf, Bad Homburg (DE)

(73) Assignee: SAP SE, Walldorf (DE)

( * ) Notice: Subject to any disclaimer, the term of this patent is extended or adjusted under 35 U.S.C. 154(b) by 1444 days.

(21) Appl. No.: 11/737,919

(22) Filed: Apr. 20, 2007

(65) Prior Publication Data

US 2008/0263195 A1    Oct. 23, 2008

(51) Int. Cl.
| | | |
|---|---|---|
| G06F 15/173 | (2006.01) | |
| H04L 12/24 | (2006.01) | |
| G06F 11/34 | (2006.01) | |
| H04L 12/26 | (2006.01) | |

(52) U.S. Cl.
CPC ........ *H04L 41/064* (2013.01); *G06F 11/3409* (2013.01); *G06F 11/3452* (2013.01); *H04L 12/2602* (2013.01); *H04L 41/147* (2013.01); *H04L 43/00* (2013.01); *G06F 11/3476* (2013.01); *G06F 2201/86* (2013.01)

(58) Field of Classification Search
CPC .................................................... H04L 41/064
USPC .................................................. 709/224, 223
See application file for complete search history.

(56) References Cited

U.S. PATENT DOCUMENTS

| | | | |
|---|---|---|---|
| 6,128,642 A * | 10/2000 | Doraswamy et al. ........ | 709/201 |
| 6,782,350 B1 * | 8/2004 | Burnley et al. ............... | 702/186 |
| 6,995,768 B2 | 2/2006 | Jou et al. | |
| 7,188,170 B1 * | 3/2007 | Burnley et al. ............... | 709/224 |
| 7,222,786 B2 | 5/2007 | Renz et al. | |
| 7,302,502 B2 | 11/2007 | Beg | |
| 7,376,902 B2 | 5/2008 | Lueckhoff | |
| 7,752,562 B2 | 7/2010 | Mohanty et al. | |
| 2004/0010716 A1 * | 1/2004 | Childress et al. ............ | 713/201 |
| 2004/0064552 A1 * | 4/2004 | Chong et al. ................ | 709/224 |
| 2005/0071286 A1 | 3/2005 | Laicher et al. | |
| 2005/0228880 A1 * | 10/2005 | Champlin ..................... | 709/224 |
| 2006/0117059 A1 | 6/2006 | Freeman, Jr. et al. | |
| 2006/0143034 A1 | 6/2006 | Rothermel et al. | |
| 2006/0200450 A1 * | 9/2006 | Keane et al. .................... | 707/3 |
| 2007/0011661 A1 * | 1/2007 | Itoh .............................. | 717/127 |
| 2012/0124503 A1 | 5/2012 | Coimbatore et al. | |

\* cited by examiner

*Primary Examiner* — Liangche A Wang
*Assistant Examiner* — Sherman Lin
(74) *Attorney, Agent, or Firm* — Schwegman Lundberg & Woessner, P.A.

(57) ABSTRACT

Real-time data is extracted from a log file for at least one monitored process on each of a plurality of servers. For each monitored process, extracted real-time data is inserted into object variables of an object. The object variable data is processed to generate performance statistics for the monitored processes and to determine whether to trigger an alarm. A database is updated with object variable data and performance statistics when an event associated with a monitored process takes place. Historical performance statistics from the database are compared with current performance statistics to determine a performance trend.

12 Claims, 7 Drawing Sheets

PERFORMANCE MONITORING

FIELD

Embodiments of the invention relate to performance monitoring, and more particularly to monitoring the performance of one or more processes running on one or more servers.

BACKGROUND

Systems based on a client/server model often include one or more servers to manage the collection, transfer, distribution, and/or storage of data. Each server in the system has runs various processes. In systems that deploy large numbers of servers, performance issues on one or more servers can cause performance issues, including bottlenecks, on the entire system.

One form of performance monitoring is designed to monitor the server processes that cause performance issues. This form of performance monitoring often includes parsing server logs and collecting performance related information about running processes. Collected information is typically dumped into a log file. Depending on how frequently information is collected from the server logs, log files can grow very large very quickly. One problem with very large log files is that they can put a strain on memory. Another problem is that large log files can be difficult to parse, making it difficult to extract useful information. These problems are compounded in a system that has a large number of deployed servers.

Given that memory imposes practical limitations on log file size, log files need to be cleared, erased and/or refreshed periodically. For example, log files may need to be cleared on a weekly or even daily basis. Clearing the log files on a periodic basis limits the amount of accessible historical data/information to the time from which the log file was last cleared to the present. For at least these reasons, performance monitoring is limited in its ability to provide accurate and meaningful statistics and/or other analytical conclusions about system performance.

SUMMARY

A method to facilitate performance monitoring and statistical analysis for a system having multiple servers is described herein. One or more log readers extract real-time data from a log file for at least one monitored process on each of a plurality of servers. For each monitored process, the extracted real-time data is inserted into object variables of an object. The object variable data is processed to generate performance statistics for the monitored processes and to determine whether any process triggers an alarm. If an alarm is triggered, a notification may be sent to an administrator. Object variable data and performance statistics are stored in a database in response to the occurrence of an event associated with a monitored process. An event could be the starting of a process, the stopping of a process, etc. System performance trends can be calculated and future performance can be forecasted by comparing the historical performance statistics to current (e.g., real-time) performance statistics. Statistics and other information related the performance of the entire system can be sent to a single monitoring station and displayed as graphs, charts, diagrams, etc.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

Performance monitoring involves monitoring the performance of processes running on servers belonging to a system that uses a client/server model. For example, a revision control system provides order, organization and management for software development projects that require multiple developers and/or programmers to create, edit, and/or modify code. Master copies of computer code are maintained by a plurality of servers connected in parallel. Developers and/or programmers working from client workstations download and upload code versions on the revision control system. Processes running on one server inevitably affect the performance of processes running on the other parallel servers in the network. These performance dependencies are not limited to revision control systems. Any client/server model system will have similar performance dependencies. Performance monitors are designed to provide information about performance issues to system administrators, etc.

The performance monitoring system described herein is split up into several autonomous scripts. In one embodiment, the scripts are programmed using Perl as the programming language. In other embodiments, other scripting languages (e.g., Bash shell, Korn shell, etc.) may also be used to program all or some combination of the scripts. The performance monitor itself is a script that runs continuously. To ensure that the script runs continuously, the script is included in a list of commands to be executed periodically by the Unix-based "crontab" command. The performance monitor's task is to collect information stored in the log files of the various servers in the system and extract the desirable and/or important information.

The performance monitor runs independently and is not accessible to users. The performance monitor reads and processes the log files of the various servers. In particular, the performance monitor reads and processes serious, critical, and/or error messages, etc., in the log files. The performance monitor also generates performance statistics and maintains lists of running processes, including a list of processes that retard other processes. Information extracted and/or generated by the performance monitor is stored in a database.

The performance monitor script includes an interface to communicate with an external script, allowing a user to view all of the information extracted and/or generated by the performance monitor. In one embodiment, a Common Gateway Interface (CGI) script communicates with the performance monitor and is accessible via a web browser.

Process data (e.g., serious, critical, error messages or other information, etc.) extracted by the performance monitor is organized/structured in the same way that the data is stored in the log files. In one embodiment, data is read out of a log file and placed into an object (e.g., a Java™ data object).

Each process to run on the system has a lifetime. When the lifetime of a process expires, interesting information about the process is stored to the database. Interesting information is compiled into "top 10" lists. For example, in one embodiment a top 10 list might include a list of the top 10 process values called and/or used along with the number of calls for each of those values. In another embodiment, the overall durations of various processes are tracked; processes with the largest sum of durations are included in a top 10 list. If a process is one of the slowest processes, its interesting data is stored in another list of slowest processes. Any process information that does not qualify for a top 10 list is discarded.

The performance monitor script begins by checking the system for those running scripts having the same name and a given parameter. If the performance monitor script finds at least one other script having the same parameter, it sends a command via the global gateway of the performance monitor. If there is no answer after a period of time the performance monitor script assumes the running script is broken and stops it as well as all forked processes of it. The performance monitor script then starts a new instance of itself now with the given parameter. To avoid greedy use of CPU-time by the script, this new instance call is made with the lowest priority. In one embodiment, the performance monitor then sends a system administrator an email about the start of the new instance.

The newly started script is the main process of the performance monitor and is, therefore, the "father" of all other processes. The performance monitor's first step is to fork for a command handler. The performance monitor then creates as many log file readers as there are servers from which to read. The performance monitor subsequently ends up in a loop.

The command handler and the log readers are created as sub-processes, or, in other words, "child" processes. If command-handler and the log-readers were handled from the perforce monitor itself, a missing input in one of the devices would delay the whole execution while other devices might still have input.

Upon starting the performance monitor, a log file is created. This log file contains the start time of the script and its forked processes, process identifications (PIDs) for the processes, and messages associated with various errors.

Figure 1:
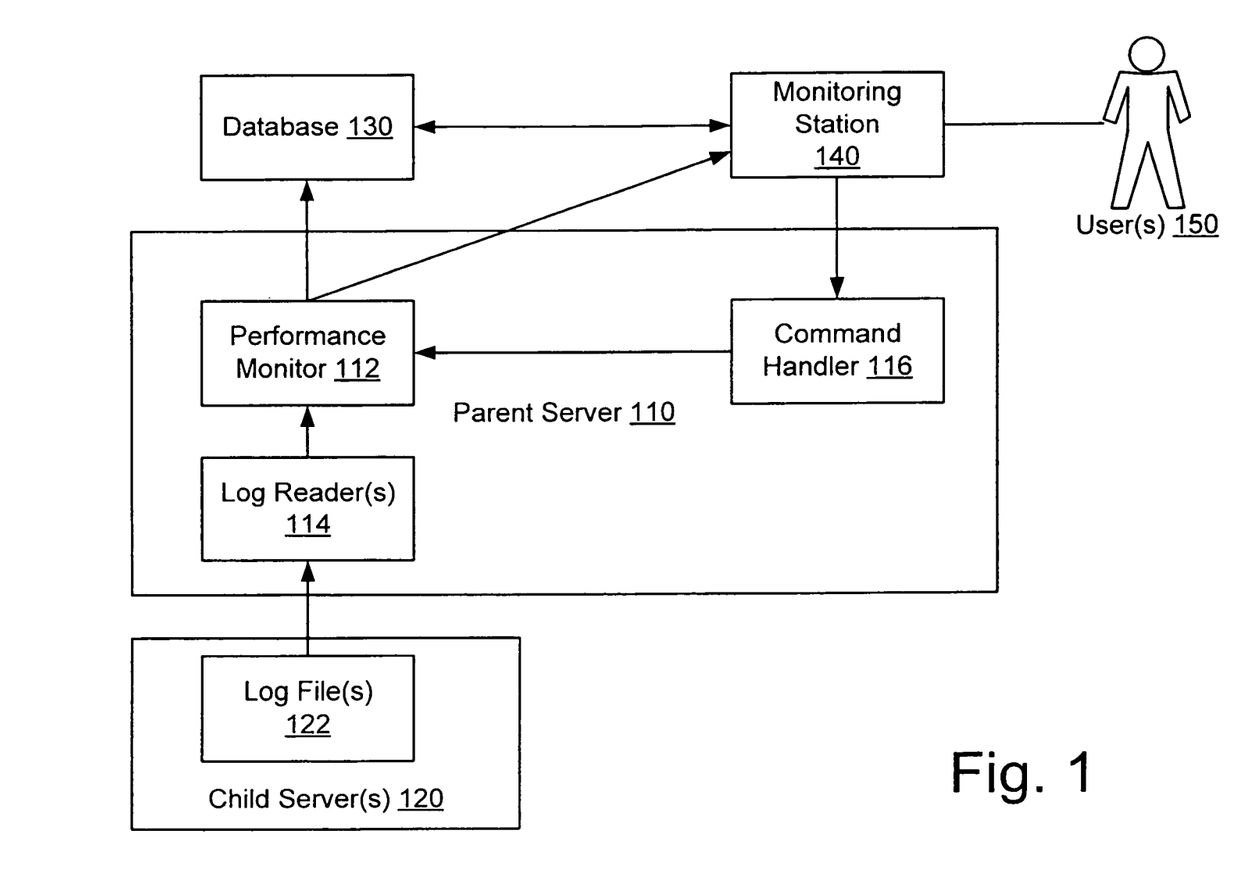
FIG. 1 is a block diagram illustrating an embodiment of a performance monitor.

FIG. 1 illustrates an embodiment of a performance monitoring system. One or more log readers 114 extract real-time data from log file(s) 122 for at least one monitored process on each of a plurality of child servers 120. For each monitored process, the extracted real-time data is inserted into object variables of an object. The object variable data is processed by performance monitor 112 to generate performance statistics for the monitored processes and to determine whether any process triggers an alarm. If an alarm is triggered, a notification may be sent to an administrator. Object variable data and performance statistics are stored in a database 130 in response to the occurrence of an event associated with a monitored process. An event could be the starting of a process, the stopping of a process, etc. System performance trends can be calculated and future performance can be forecasted by comparing the historical performance statistics to current (e.g., real-time) performance statistics. Statistics and other information related the performance of the entire system can be sent to a single monitoring station 140 and displayed for user(s) 150 as graphs, charts, diagrams, etc.

Figure 2A:
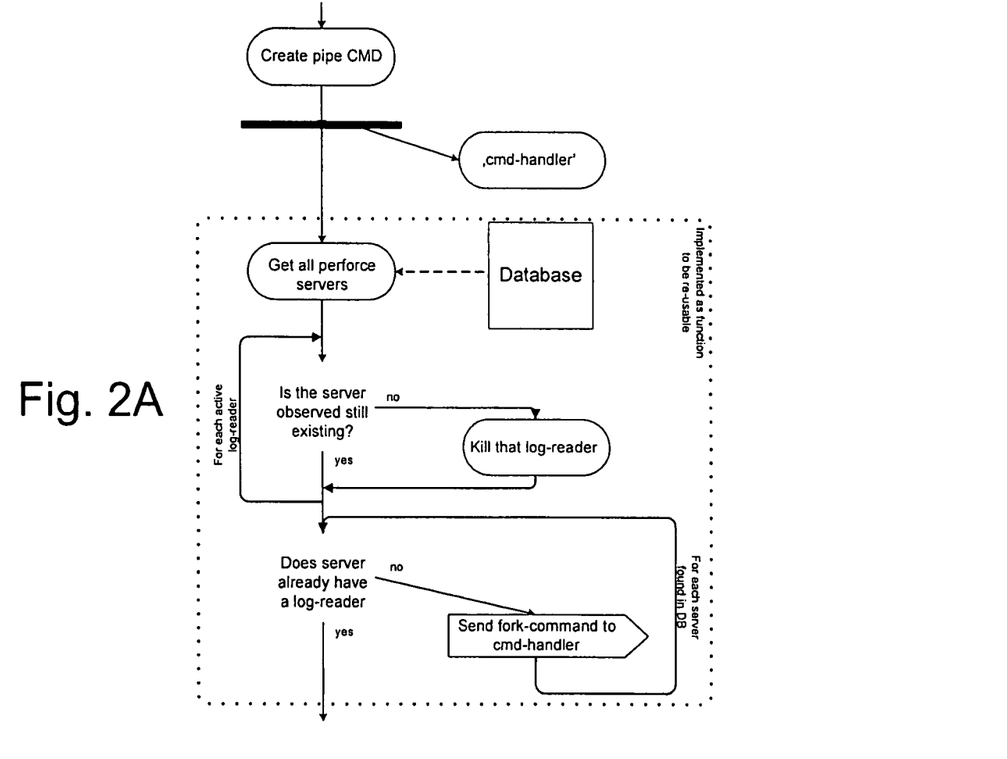
FIG. 2A illustrates an embodiment for creating a forked process.

FIG. 2A illustrates an embodiment for creating a forked process. Before the fork is done, the pipe for communicating with the command handler is created using a pipe creation command. At the next step the command handler is forked. Both the main process and the command handler define their end of the anonymous pipe. The main process then gets a list of all actual readable servers from the database. The list of readable servers is used for two loops (shown in the dot-framed area). First, the main process checks whether there is a log file reader for a server that does not exist anymore; if so, the log reader is killed. Next, the main process checks if there are new servers, which are not already on the list of readable servers. A new log reader is started for each of these new servers. This routine for server/log file reader synchronization is done once when the script starts, but can be started again later.

Figure 2B:
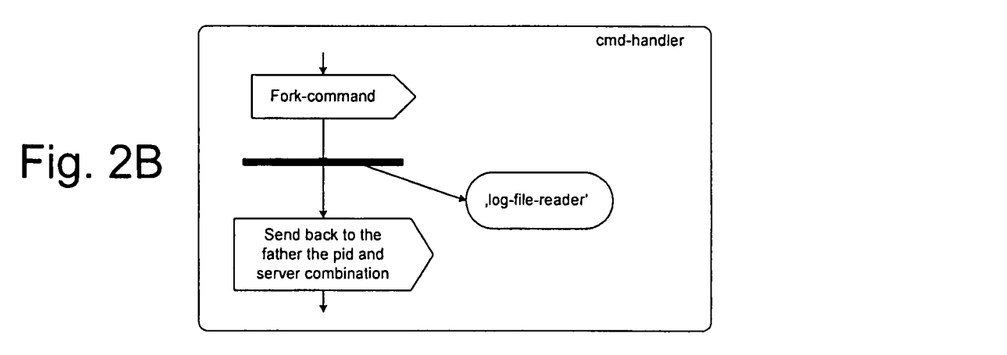
FIG. 2B illustrates an embodiment for receiving a forked process.

The command handler receives the fork command and sends the combination of PID and server name back to the main process (father), as shown in FIG. 2B. This information is stored to easily synchronize servers and log file readers later.

After all necessary children are created and other preliminary steps have been taken, the performance monitor falls into a routine which can be divided into three parts. First, the performance monitor checks for a new command (from the command-handler) and work on the new command if one exists. Next, the performance monitor checks for the next single line from a log reader and works on it. Finally, the performance monitor determines whether an alarm needs to be sent. As the script works on all three parallel, the information sent over the pipe by both command reader and log file reader fits into a single line. In this way, every pipe can be checked one by one without fleecing any one of them.

One part of the main process loop checks for new requests, which are handed over from the command-handler child process. The table below shows, which commands are treated by this part of the script and their meanings:

| Command | Possible parameters | Description |
| --- | --- | --- |
| stop | — | Ends all forked processes and then the performance monitor itself.<br>This is needed to stop all running script-processes, as in any other way of stopping the script there would be zombies left. |
| stillrunning | — | This is the request from a new instance of the script. It is to ensure that the running script is still able to communicate.<br>Output of this is send over named pipe. |
| fork | process-id, server | The information from the cmd-handler about a successful fork of a log-reader-child. The two parameters are saved to a list so that they can be accessed on later checks. Process-id here means that of the newly created log-reading child |
| config | task | For parameter task there are two possibilities: 'alarm' or 'server'. With this the script is requested to update its alarm-values or the reachable servers from the database. |
| getInfo | — | A request from the user interface: This asks to send back a list of the actual observed servers as well as all host names the servers belong to.<br>Output of this is send over named pipe. |
| data | server | The request for all actual running command process on the given server. This includes also the list of the retards of the day.<br>If a host is given instead of a server the data to send differs. The parameter name is still server in this case.<br>This request appears on user action in the browser.<br>Output of this is send over named pipe. |

The performance monitor reads and handles the command process information from the log file. This information arrives through a named pipe (as opposed to an anonymous pipe), which can be locked for writing so that the log file reading processes do not disrupt each other. In one embodiment, each information package is contained within a single line. The lines start with the number of transferred letters and a message ID to ensure that no messages or any part of a message is lost. The transferred letters and message ID are followed by a global ID, which contains a server number, the date of the command process activity and an ID unique for that date and server. It is followed by information identifying the data. This is done for the purpose of handling server starts and stops differently. Finally, the information package includes a dumped object containing the command process. This contains the full object in pure text form and will be used to rebuild the object again.

If a server start arrives, the saving routine is started for the associated sub-process. The information collected during the last server run will be saved to the database and then the memory is freed to receive new information. In contrast, a server shutdown is only recorded, but no further action is taken. Handling of a command process depends on whether the process is a process start or a process end. Upon a process start, the process is simply added to the list of open command processes and some values are checked for alarm-conditions. Conditions which are checked at this time are IP-address, application, user, client and command. Upon receiving information about a process end, the process is deleted from that list.

Whenever a command process is about to stop, the oldest process of the running command processes is searched, as this process might be retarding other processes. After finding the oldest command process and counting how many others it has slowed down it is checked to determine whether an alarm for this process needs to be sent.

Some of the alarm checks are done right when an object is created. As this is not possible for all kinds of alarms, there are two additional checks according to one embodiment. First, the duration of all running processes is check. This check goes through every list with open command processes for all the servers and calculates the duration of the oldest process in each list. Then it compares this duration to the defined alarm-values for that server and sends an alarm if necessary. Second, the list with the previously sent alarms is check. After an alarm is sent, the concerned category and the server are stored in a list. New incidents with a category-server-combination in that list are not alarmed. This is meant to avoid an email-flood as the script might otherwise send emails faster than anyone would be capable of reacting. So, in this alarm check, every entry which is older than a given time is deleted again. In this way, repeated alarms are only sent out after that given time (presumably for a new instance of the alarm). This delay in sending alarms is not influenced by a server start. In one embodiment, the time for the delay can be configured within the other alarm settings.

The command reader directly reads from a pipe to communicate with the CGI-script. As this is normally to communicate with a non-familiar process, a named pipe is used for that.

Just like any other pipes, the named pipes block reading if there is nothing to read. This does not pose any problem in the case of the command reader, as it only gets its tasks from there and does not need to do anything simultaneously. Depending on the command read in the pipe the command reader is just used as a listener or handles the task directly.

The command reader divides its requests in two categories. The first category is a fork of a new log file reader. The second category includes commands that are not directly handled by the command reader. Those commands are not viewed in more detail from the command reader.

There is one log file reader for each available server found in the database. The script for each of the child-processes has a single task—to read the lines of the log file and process them in a given way. Therefore, every command process is represented by an object. The log file reader has to manage those objects.

Given that the log files are opened with a tail+0f command, the script starts by reading the first lines and if there is no next line, it blocks and waits for it. This command ensures that no lines are missed The shutdown of a server is checked manually by the surrounding script. After a line containing a server shutdown command is read, the corresponding file in the operating system is checked.

Figure 3:
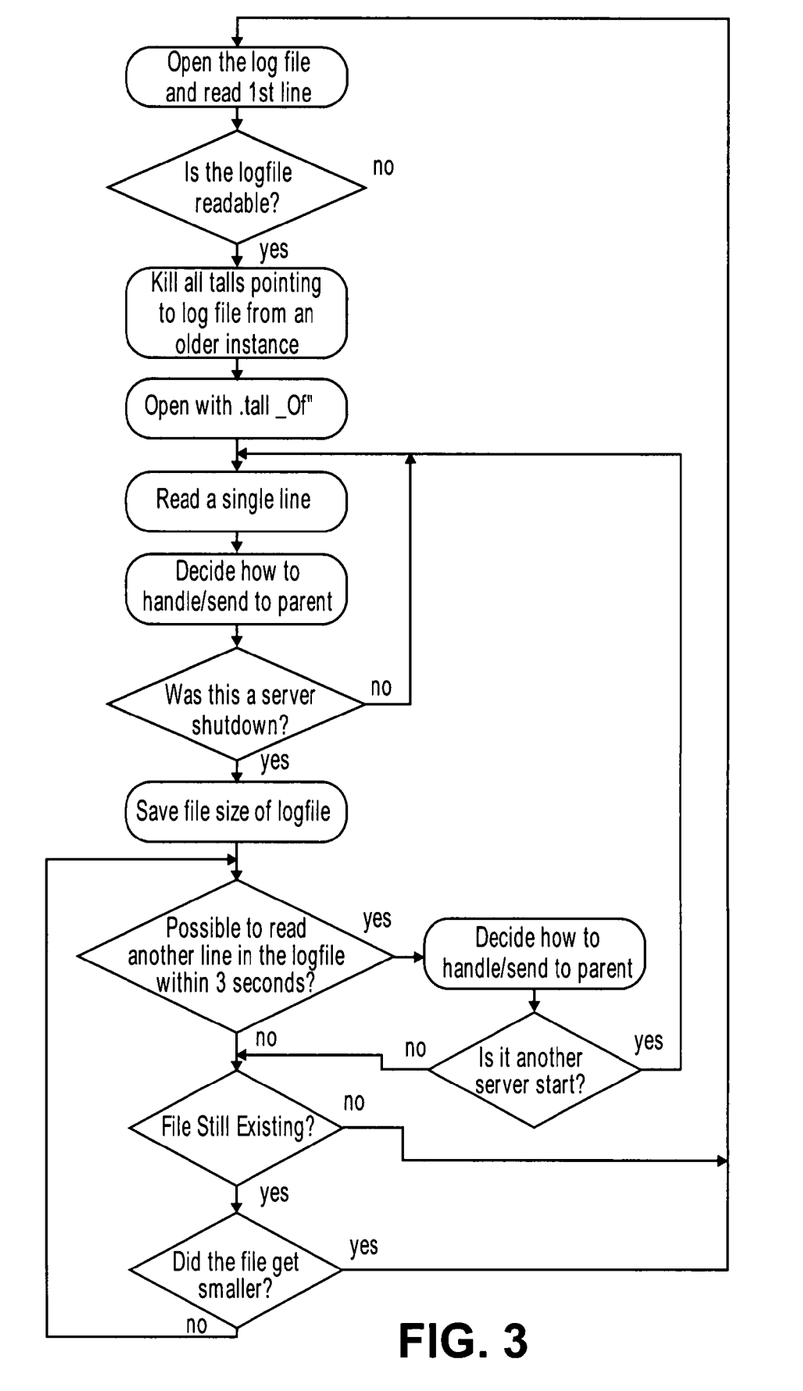
FIG. 3 illustrates an embodiment for processing a log file.

FIG. 3 illustrates an embodiment for processing a log file. The log file is opened and the first line is read. If the log file is readable, all tails pointing to the log file from an older instance are killed. The log file is then opened with the "tail+0f" command and a single line is read from the log file, A decision is made on how to send the line to the parent. If the line indicates a server shutdown, then the size of the log file is saved. A determination is made whether a second line from the log file can be read. If yes, a decision is made on how to send the second line to the parent. If not, a determination is made as to whether the file still exists. If not, the loops start over. If yes, the log file reader determines whether the file has gotten smaller.

A GUI-response time simulator is an independent script which is scheduled via the "crontab" command to run every two minutes, according to one embodiment. The GUI-response simulator generates those command processes.

There are three steps performed by this script. First, it creates a single connection to each active server registered in the database, which means only one PID will be visible in the log file. Second, the simulator initially connects to each server using the default user and client settings. Third, the simulator starts a set of commands to retrieve a list of active servers from the database. The performance monitor handles these command processes like all others. Additionally, the duration of the entire set of command processes is saved to be able to evaluate the trend of the response time during the day.

By selecting a server and the day "today," the actual status for that server is requested from the performance monitor. This status shows some general information about the server, such as which host it is and when it was started last. After that a list with all actual running command processes is shown.

Figure 4:
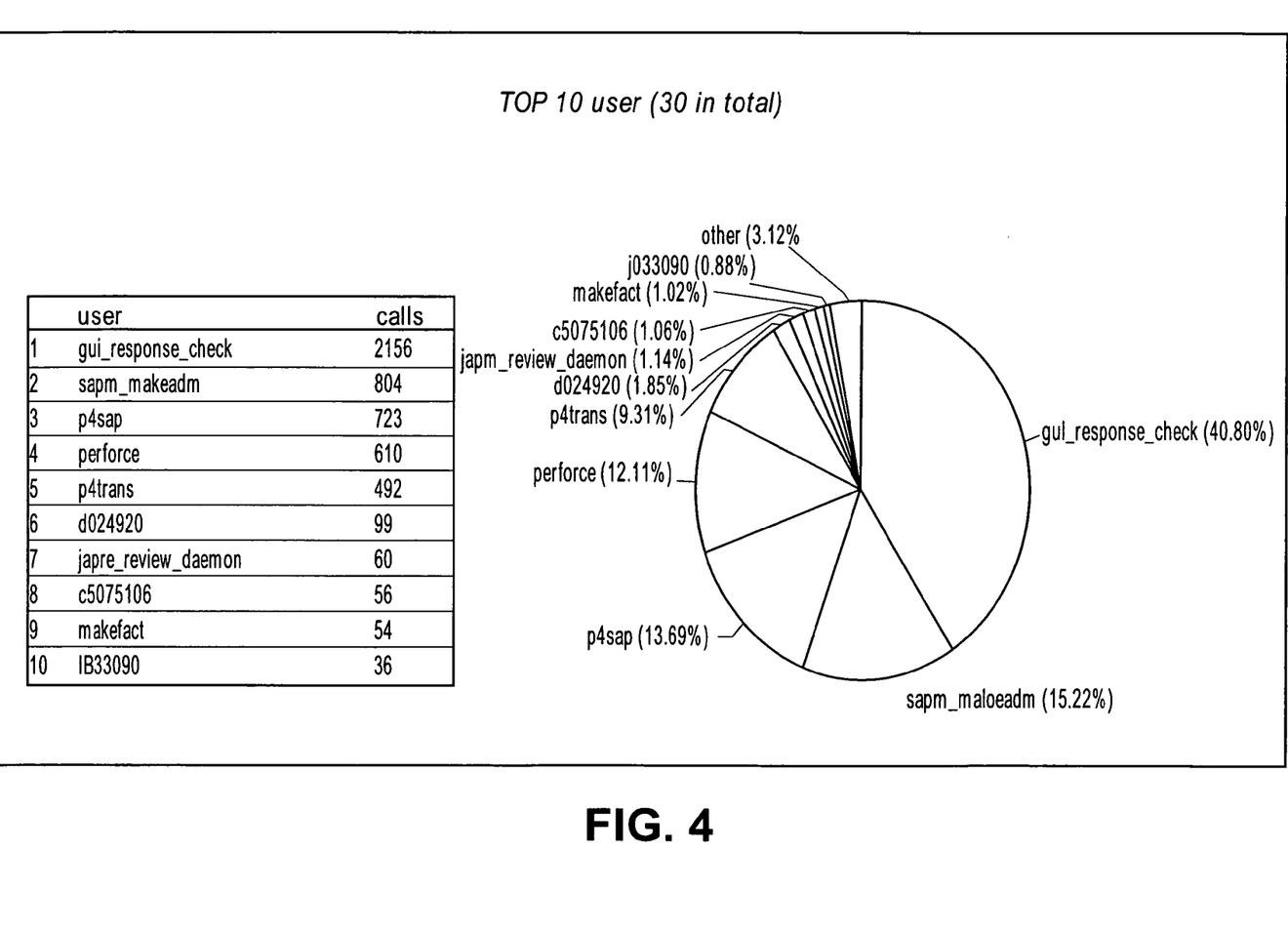
FIG. 4 illustrating an example of a top 10 display according to an embodiment.

Additionally, tables of various top 10 lists may be shown. The tables show the most called/used values along with their number of calls. Next to each table is a diagram showing the spreading in relation to all calls. FIG. 4 is a computer screen shot illustrating an example of a top 10 display.

Some of the tables may have special information. For example, top users tables might show how many different users used the server. The IP table shows the country from which IP-address originates. In another example, one of the top tables shows the durations of all command processes as an overall sum and distinguishes those processes having the biggest sum of durations.

The display may also include four process related tables. They are sorted by longest compute time, longest complete time, biggest pf-value and biggest us-value. They show the command process information. The header of the table shows (in brackets) how many command processes are in each category.

Yet another display shows a list of the most retarding command processes. This list shows how many command processes are running in parallel and which command process is the oldest during that time. In one embodiment, it is determined that the oldest command process is retarding the others.

The timetable view of commands shows lists for every hour since the last server start, including which command of the command processes was called and how often it was called. For the user-sync commands, per minute averages are also shown. Additionally, there are sums per hour, per day (for all and each command in detail) as well as an overall sum for all and each command since the last server start.

Figure 5:
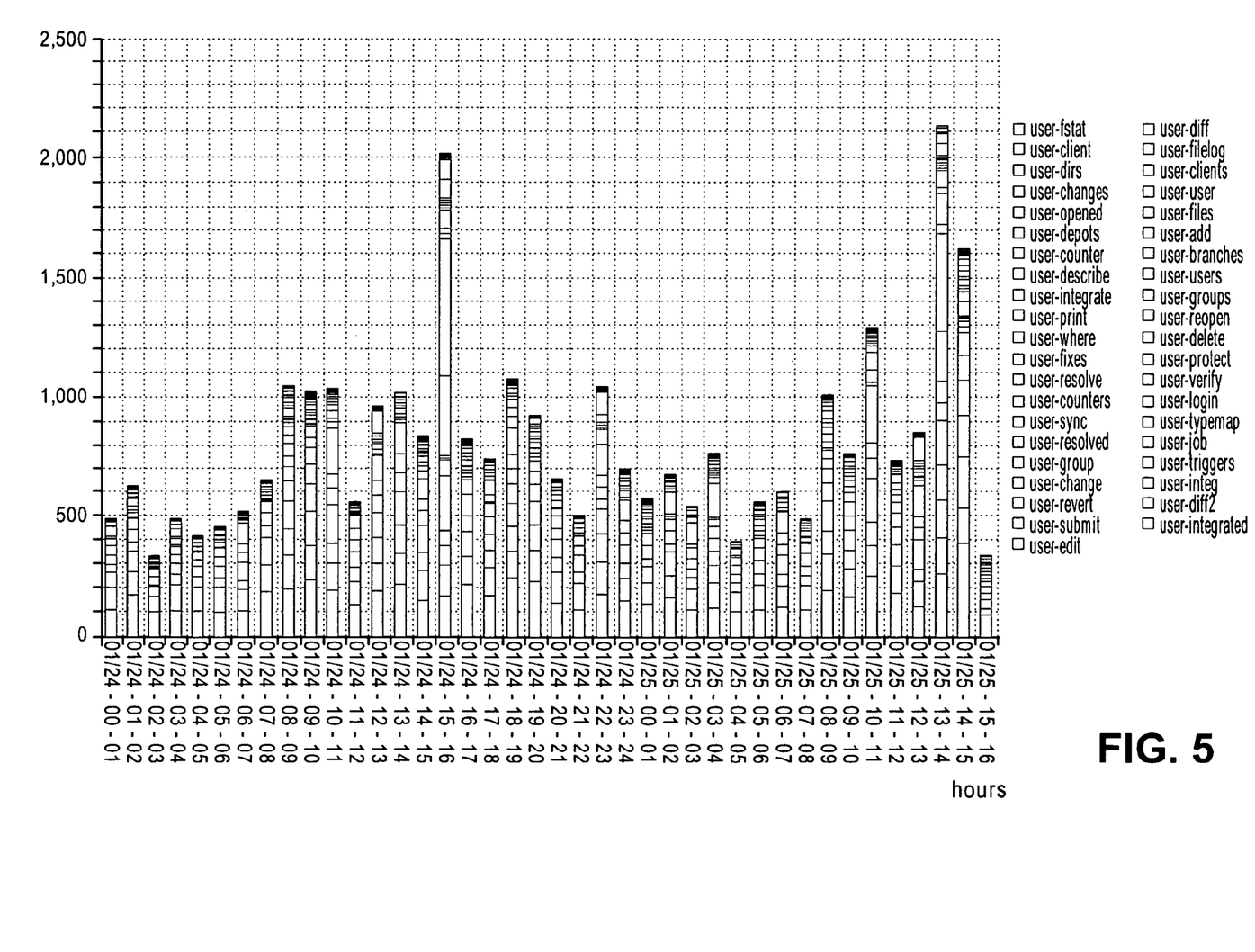
FIG. 5 illustrates a bar chart according to one embodiment.

This table can be very big and special situations cannot be spotted easily. Thus, in one embodiment, another diagram shows the data of the table in a bar chart. An example bar chart is shown in FIG. 5.

Figure 6:
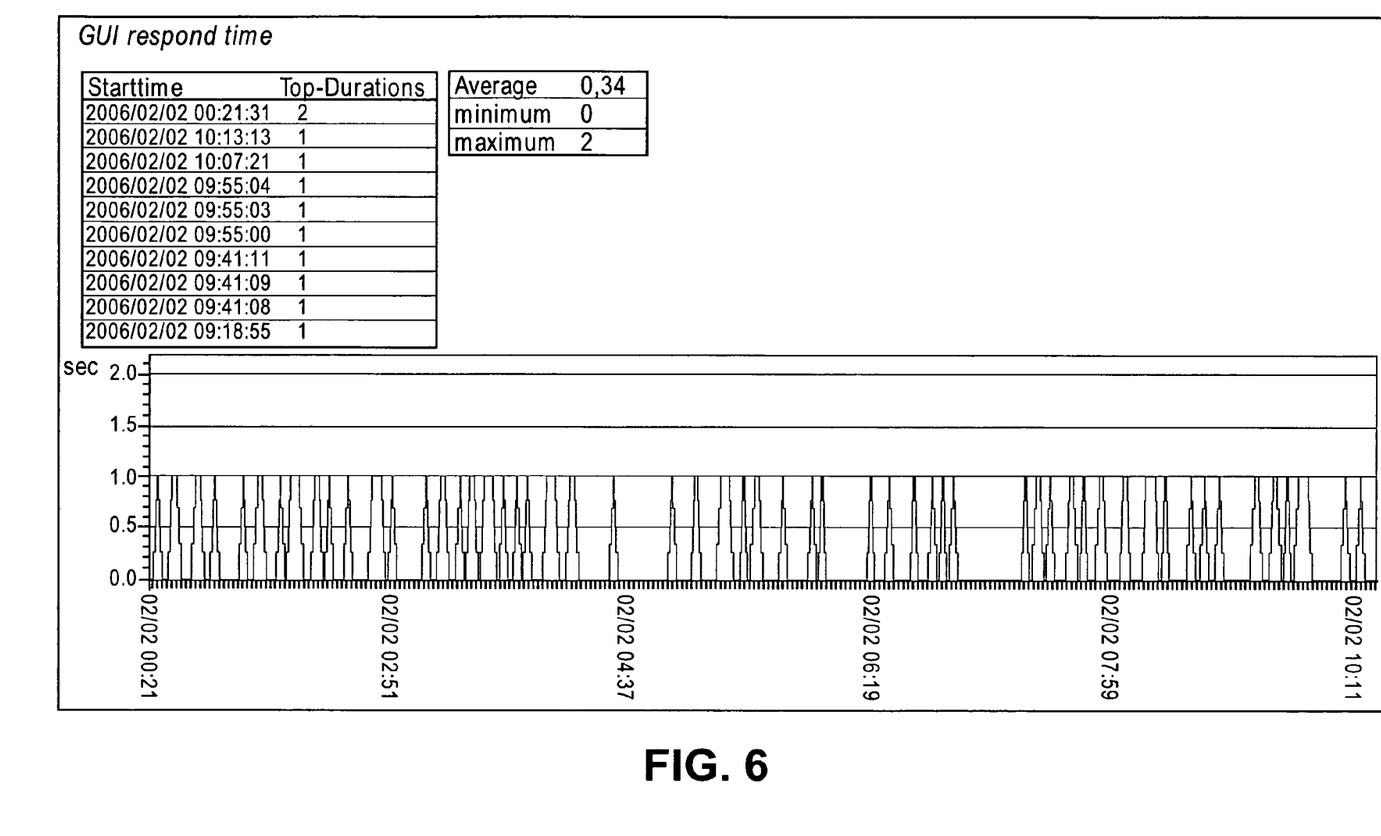
FIG. 6 illustrates an embodiment of an output display.

Also, the GUI-response time may be shown in one embodiment. An area chart shows the GUI-response time for each time it was checked. Additionally, another table shows the longest and the shortest duration as well as the average of all tests for the GUI-response time. An example is illustrated in FIG. 6.

Other than selecting a server, a user can select a whole host or even all hosts at once. This will first indicate how many servers are on that host, how many command processes there are on the host, and how many command processes are running in parallel at the moment. Then there is just one list containing all running command processes on that host. This list differs from the list for just one server due to an extra column showing the belonging server. That list is also sorted with the oldest command process on top.

A second table contains a row for every server on that host with some general data. There are links to the server-page of each server and if this is the "all hosts" view there are also links to the single host. Then there are three columns about the GUI-response time, similar to that on the server page. Lastly, the start and sum of processes are shown. The adjusted sum of processes and average means that in this sum the command processes for calculating the GUI-response time are subtracted. The last number shows the number of different users which sent commands on that server since the last server start.

In this view, the only thing done by the CGI is sending the command to the performance monitor and parsing the answer to have tables with the wanted information. Additionally, it calls another script which creates all diagrams and hands the data to that over a session (only used in server view).

When the value "today" is selected with a server (not a host), two new fields can be seen in the selection header. Those can be filled with both a start-timestamp and an end-timestamp in order to have all command processes which occurred in between. If there is a start-time given but no end, this shows only that single second.

This task is done by the CGI-script itself as it would only burden the performance monitor without any need for it. The log file is opened and read out, but only the command processes that were active during in the selected time frame are kept and then shown in a table.

To view an older day, all data to be shown is requested from the database and no communication with the performance monitor is needed. With its layout this view is nearly the same as the actual view for a server, only the table with actual running processes is not needed and additional there is information about the server shut down.

The configuration view is only available for the perforce administration team. The script gets the current settings that are stored in the database. It just puts the information in a form and presents it to the user, who has now the possibility to change whatever needs to be changed, including the deletion of alarms or creation of new ones.

On the user's submission the script will form several queries to send the changed settings to the database. After this, it sends a command to the performance monitor indicating that it has recently changed the alarm settings. However, on this command, the performance monitor will read out the settings. After its work is done, the script shows the new settings for the alarms and waits for more user input.

The server settings show two buttons, but no other entry possibilities. The server update option forms a request to update the list of observed servers by the performance monitor and therewith all the log file readers.

The other button is for cleaning up tails. Normally, each log file reader shall manage the running tails on its log file. If there is an open tail which is not needed any more, this option will kill those processes (e.g., this will be needed if a log file reader was stopped and will not be started again.)

In an embodiment where Perl is used as a programming language, it should be noted that Perl does not use "classes." Thus, those objects do not have any protection and are assembled as special hashes. This is more comparable to what other languages call "struct." Despite this distinction, the term "class" is used herein.

Figure 7:
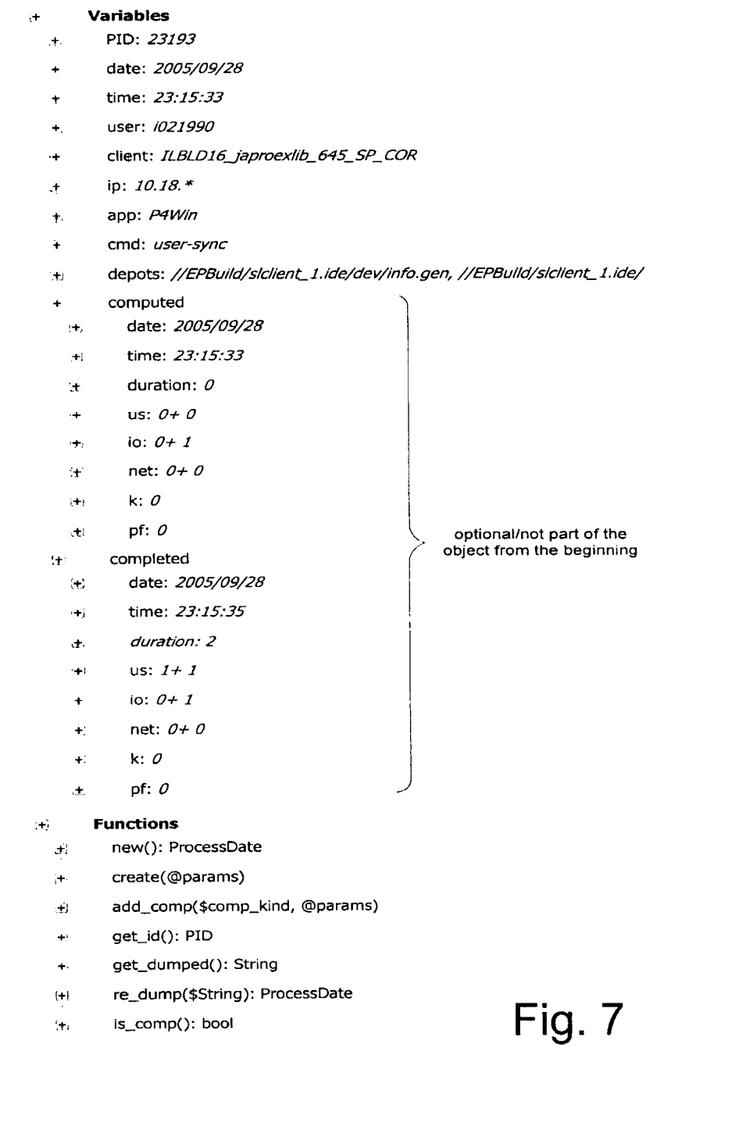
FIG. 7 illustrates variables and their functions according to one embodiment.

This class is the only newly created module. Its main task is the storage of the data existing for a command process, no matter which state this command process is in. Its internal variables are assembled of simple values and other hashes. FIG. 7 illustrates an example of the variables and their functions.

When a new object is created, the simple variables are directly created, too. The "computed" and "completed" hashes are—unlike the variables—created when the request to fill their values arrives. As most of the command processes will never have any computed section, data volume can thus be reduced. The depots are saved in an internal array. All values occurring with a command process will be saved in this object. Upon creating and later expanding the object all values are checked and shortened if necessary. This is done to ensure no database error occurs when later saving the object.

The functions 'create' and 'add_comp' are just to fill the object with data. The function 'add_comp' therefore gets an additional value as it can either be used to add data for 'compute end' and for 'completed' information. This is possible, because they both have the same structure in the log file. The 'get_ID' command is one simple get-method and returns the command process ID that was used on the server. The 'is_comp' command returns information on whether there is already a completed hash inserted.

The 'get_dumped' and 're_dump' commands are the functions for using this object with a pipe. As communication with pipes requires having only strings, the 'get_dumped' returns a single line string, which contains the whole object. And giving this string to the function 're_dump' returns a complete object again.

As this functionality should not only be used by the performance monitor, but also by the browser-script, it is separated in the modules section and can be included like any other module.

A database is needed for two different purposes. The first purpose is to keep historical daya, not just data for the current day. If historical data were kept by the script, the amount of data would grow to be very large. Also, the historical data is only accessed via the browser and thus the database reduces the load carried by the performance monitor. The second purpose of the database is to store alarm values. Alarm values are set by a system administrator or an administration team using the CGI-script. The CGI script needs the values for displaying data in a different view, while the performance monitor needs the information for its alarm-checks.

To start with the data storage, there first are the normal top ten statistics which only need to keep some string (for application, usernames, etc) and the number of appearances of this. This is stored and stuck to a date, a server and a category as well as the position in the top ten list.

| CATEGORY_ID | CATEGORY_NAME |
|---|---|
| 1 | app |
| 2 | ip |
| 3 | cmd |
| 4 | user |
| 5 | user@client |

The next part in data storage needs to be stuck to a special command process. This might be a server start or stop or a retards list as well as the command processes with longest computing or completing time. Also, one command process

| CATEGORY_ID | CATEGORY_NAME |
|---|---|
| 1 | serv_act |
| 2 | retard |
| 3 | cu_time |
| 4 | cl_time | might show up in different categories. As in the case above, categories are known before use and stored separately.

The data for the timetable view of commands is also stored in the database. This saving needs only one table.

| PERFM_CMD_MAIN_BS | |
|---|---|
| PK | SERVER |
| PK | DATE |
| PK | HOUR |
| PK | CMD |
| | SERVERSTART |
| | CALLS |

Last savings for data from the command processes is to save the gui-response-times. This also needs just one table as there is only the duration saved for each occurring timestamp.

| PERFM_GRT_MAIN_BS | |
|---|---|
| PK | SERVER |
| PK | TIMESTAMP |
| | DURATION |
| | SERVERSTART |

For the alarm part there are also different categories, for which alarm values can be stored. Just like in the other cases above, those reasons are stored in a separate table.

| REASON ID | REASON NAME |
|---|---|
| 0 | settings |
| 1 | duration |
| 2 | retards |
| 3 | app |
| 4 | user |
| 5 | client |
| 6 | cmd |
| 7 | ip |

The main table contains the alarm values and a link to the categories, as well as information about the used communication channel. In the third table there is one value for each alarm-server combination. The servers in this table are linked to the yet existing server table in the database.

Each component described herein may be a means for performing the functions described. Each component described herein includes software, hardware, or a combination of these. The components can be implemented as software modules, hardware modules, special-purpose hardware (e.g., application specific hardware), embedded controllers, etc. Software content (e.g., data, instructions, configuration) may be provided via an article of manufacture including a machine readable medium, which provides content that represents instructions that can be executed. The content may result in a machine performing various functions/operations described herein. A machine readable medium includes any mechanism that provides (e.g., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.)

A machine readable medium may also include a storage or database from which content can be downloaded. A machine readable medium may also include a device or product having content stored thereon at a time of sale or delivery. Thus, delivering a device with stored content may be understood as providing an article of manufacture with such content described herein.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method, comprising
    extracting real-time data from a log file for at least one monitored process on each of the plurality of child servers with a corresponding log file reader at a parent server;
    iteratively reading command process information from the log files with the corresponding to file readers, each command process information contained in a single line, and determining how to send the single line to the parent server until the single line indicates that a corresponding child server has shut down or until the single line cannot be read;
    for each monitored process, inserting extracted real-time data into object variables of an object;
    processing object variable data to generate performance statistics for the monitored processes and to determine whether to trigger an alarm, the processing including identifying how many monitored processes are running in parallel and which of the running monitored processes is the oldest to identify one or more monitored processes that retard other monitored processes;
    updating a database with object variable data and performance statistics in response to the occurrence of an event associated with a monitored process; and
    comparing historical performance statistics from the database with current performance statistics to determine a performance trend.

2. The method of claim 1, wherein the performance trend is a trend of process response time for a given time period.

3. The method of claim 1, wherein the performance statistics include a list of processes having the longest sum in duration.

4. The method of claim 1, further comprising:
    counting how many other monitored processes have been slowed down by the oldest monitored process; and
    checking to determine whether to trigger the alarm for the oldest monitored process.

5. A non-transitory machine-readable storage medium storing a set of instructions that, when executed by a processor, causes the processor to perform operations, comprising:
    extracting real-time data from a log file for at least one monitored process on each of the plurality of child servers with a corresponding log file reader at a parent server;
    iteratively, reading command process information from the log files with the corresponding log file readers, each command process information contained in a single line, and determining how to send the single line to the parent server until the single line indicates that a corresponding child server has shut down or until the single line cannot be read;
    for each monitored process, inserting extracted real-time data into object variables of an object;
    processing object variable data to generate performance statistics for the monitored processes and to determine whether to trigger an alarm, the processing including identifying how many monitored processes are running in parallel and which of the running monitored processes is the oldest to identify one or more monitored processes that retard other monitored processes;
    updating a database with Object variable data and performance statistics in response to the occurrence of an event associated with a monitored process; and
    comparing historical performance statistics from the database with current performance statistics to determine a performance trend.

6. The non-transitory machine-readable storage medium of claim 5, wherein the performance trend is a trend of process response time for a given time period.

7. The non-transitory machine-readable storage medium of claim 5, wherein the performance statistics include statistics indicating one or more processes, if any, that retards other processes.

8. The non-transitory machine-readable storage medium of claim 5, wherein the performance statistics include a list of processes having the longest sum in duration.

9. An apparatus, comprising:
    a log reader to extant real-time data from a log file for at least one monitored process on each of a plurality of child servers;
    a processor for a performance monitor, the processor configured to:
        iteratively read command process information from the log files with the corresponding log reader, each command process information contained in a single line, and determine how to send the single line to a parent server until the single line indicates that a corresponding child server has shut down or until the single line cannot be read;
        for each monitored process, insert extracted real-time, data into object variables of an object;
        process object variable data to generate performance statistics for the monitored processes and to determine whether to trigger an alarm, the processing including identifying how many monitored processes are running in parallel and which of the running monitored processes is the oldest to identify one or more monitored processes that retard other monitored processes;

update a database with object variable data and performance statistics in response to the occurrence of an event associated with, a monitored process; and compare historical performance statistics from the database with current performance statistics to determine a performance trend.

10. The apparatus of claim 9, wherein the performance trend is a trend of process response time for a given time period.

11. The apparatus of claim 9, wherein the performance statistics include statistics indicating one or more processes, if any, that retards other processes.

12. The apparatus of claim 9, wherein the performance statistics include a list of processes having the longest sum in duration.

* * * * *